3 Sheets—Sheet 1.
B. F. ASPER & R. MAGILL.
Apparatus for Boring Oil-Wells.
No. 208,555. Patented Oct. 1, 1878.
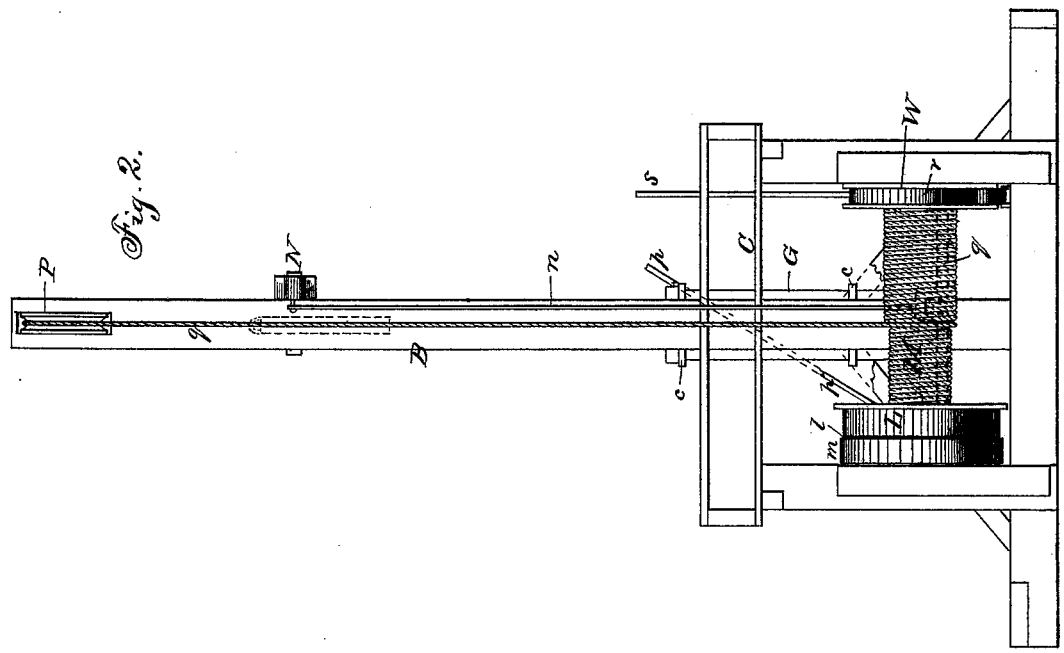
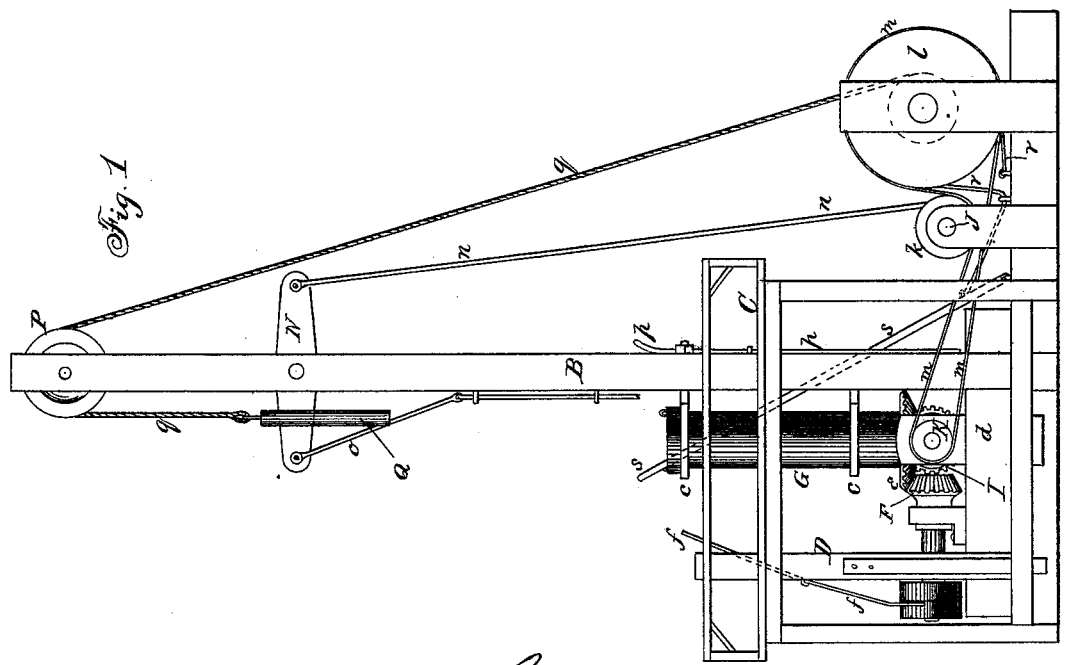
Witnesses.
Jos. B. Connolly
F. W. Dunwoody
Benjamin F. Asper,
Robert Magill, Inventors.
by Connolly Bros & McTighe
Attorneys.

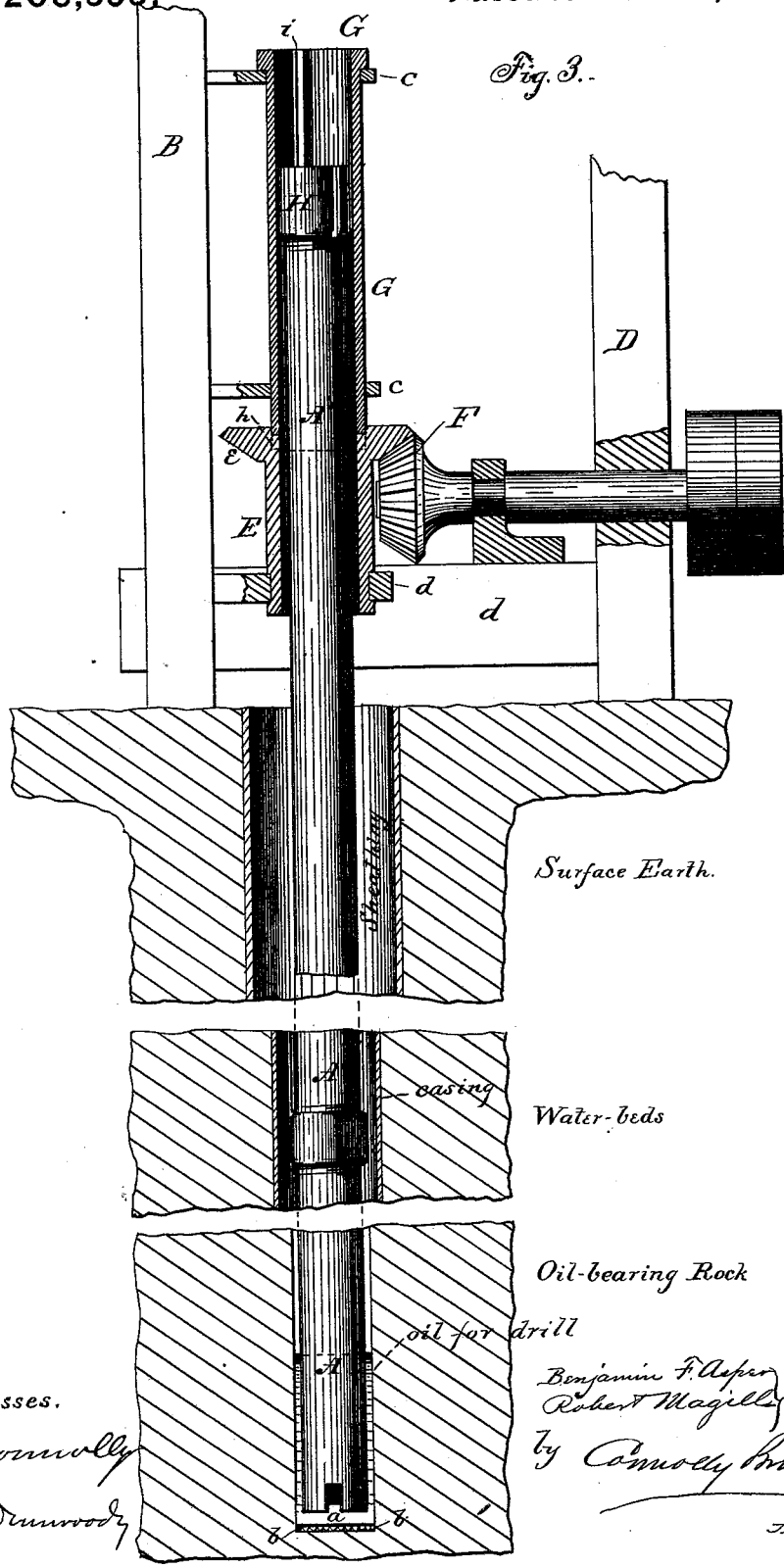

3 Sheets—Sheet 3.
B. F. ASPER & R. MAGILL.
Apparatus for Boring Oil-Wells.
No. 208,555. Patented Oct. 1, 1878.
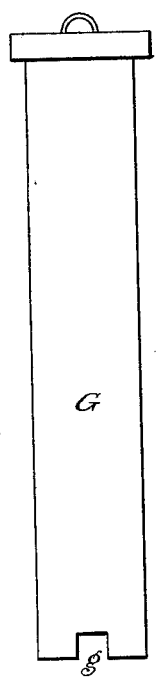
Fig. 4.
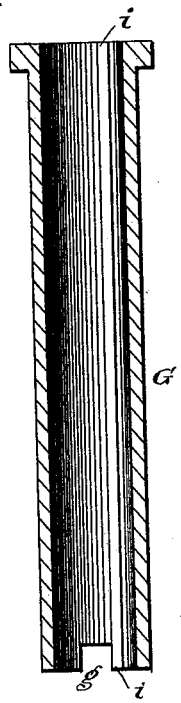
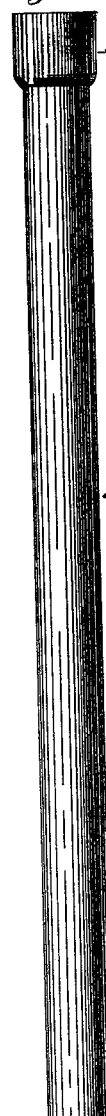
Fig. 8.
Fig. 9.
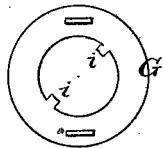
Fig. 5.
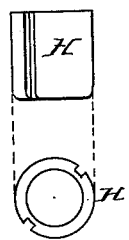
Fig. 6.
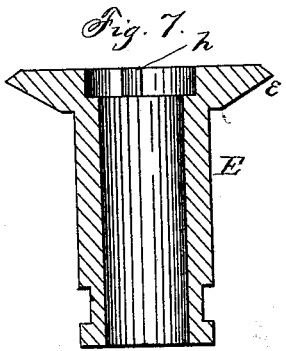
Fig. 7.
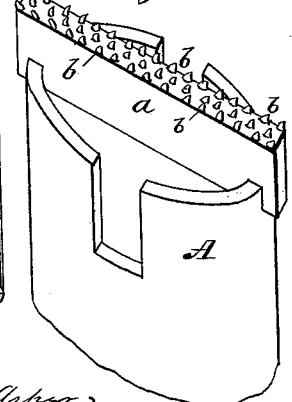
Fig. 10.
Witnesses.
J. B. Connolly
F. M. Dinwoody
Benjamin F. Asper,
Robert Magill, Inventors.
by Connolly Bros & McTighe
Attorneys.

UNITED STATES PATENT OFFICE.

BENJAMIN F. ASPER AND ROBERT MAGILL, OF PITTSBURG, PENNSYLVANIA.

IMPROVEMENT IN APPARATUS FOR BORING OIL-WELLS.

Specification forming part of Letters Patent No. 208,555, dated October 1, 1878; application filed June 14, 1878.

*To all whom it may concern:*

Be it known that we, BENJAMIN F. ASPER and ROBERT MAGILL, of Pittsburg, in the county of Allegheny and State of Pennsylvania, have invented certain new and useful Improvements in Apparatus for Boring Oil-Wells; and we do hereby declare the following to be a full, clear, and exact description of the invention, such as will enable others skilled in the art to which it pertains to make and use it, reference being had to the accompanying drawings, which form part of this specification, in which—

Figure 1 is a side elevation; Fig. 2, an end elevation; Fig. 3, a sectional view of well, &c.; Fig. 4, detail of feeding-sleeve; Fig. 5, plan of feeding-sleeve; Fig. 6, details of collar; Fig. 7, details of sleeve-gear; Fig. 8, view of collar and pipe; Fig. 9, view of drill and stock; and Fig. 10 is a detail of drill.

Our invention relates to boring oil-wells; and it consists in the following particulars: an open-bottom rotary tubular drill-stock, having one or more cross-bars at its lower end, armed with diamonds or other cutting-points; the combination of such with a rigid tubular surface connection or drill-rod; the combination of the foregoing with a sand-pump operated or capable of operation inside the drill without disturbing or removing the tools; the combined bull-wheel and sand-pump reel; and the arrangement and combination of mechanism substantially as hereinafter fully described and claimed.

The usual manner of boring and testing oil-wells is as follows: The earth is penetrated to "surface-rock" either by digging or driving a pipe, the hole being larger than the well to be bored. This is then sheathed with pipe or timber to prevent caving in. Then a drill is lowered, and operated by rope or rod connection until the cuttings or sand prevent further progress. The drill is then hoisted out and a sand-pump lowered, consisting of a long tube or bucket, having a valve below, through which the sand rises into the bucket, which is then hoisted to the surface. The drill is then lowered to work, and operated till the sand again gets too deep, when the cleaning-out process is repeated. This cessation of drilling to sand-pump and the time wasted in dressing the tools cause well-boring to be very costly and slow work. When the drill has reached or passed the lowest fresh-water course, the tools must all be withdrawn and casing inserted to shut off the water completely from the remainder of the well to be bored, which must be done before the oil-bearing rock is penetrated. Then a smaller drill is inserted and boring continued, water being supplied to the drill by pouring it in at the mouth of the well. This causes more trouble, as the water causes the sand to cake in the well and clog the tools, necessitating their already frequent withdrawal to be more frequent still. Finally, when oil is struck, the tools must all be withdrawn and tubing inserted continuously from the surface down to the oil-spring, a pump introduced, and the capacity of the well tested. In what are known as "pumping-wells," as distinguished from "flowing-wells," no means of testing their capacity exist save the above insertion of tubing after withdrawing the tools; and this is not only expensive, but gives rise to such loss of time as, in case of the well proving a dry hole, works ruin to the operator, who, if he could tell at once the character of the well, might have another started and save himself.

We propose to introduce a new system of boring, such that the given depth may be reached in a much shorter time, and in such manner that, when the oil-level is reached, the test may be made at once. Our invention, then, is as follows: We use a drill of peculiar form, consisting of a tubular drill-stock, A, having at its bottom one or more cross-bars, *a*, whose lower edge is armed with carbon or other cutting points, *b*, said lower edge being at right angles to the axis of stock A, to lessen the liability to catch and wedge into seams or cracks in the rock. The drill-stock has its lower end preferably slotted or cut away at the sides, to allow free entrance of the sand, and has its upper end threaded or provided with other means of ready connection to the remaining parts.

As our invention relates only to the drilling after reaching so-called "surface-rock," we need not describe the process of penetrating the surface-earth, but will now suppose that process to be accomplished, and therefore confine our remarks to the actual drilling and completion of the well.

The described drill is lowered into the hole by coupling on successive joints of rigid metallic pipe A', leaving a continuous open passage-way inside to the drill, and when this touches surface-rock we construct and opererate as follows:

A gin-pole, B, is erected a little to one side of the hole, having a suitable platform, C, arranged as shown. Fixed to the post B are two guiding-rings, c. A second post, D, rises on the opposite side of the hole to or above the platform, and between the two a strong journal-bearing, d, is arranged, and in this is journaled vertically a hollow sleeve, E, having at its top a large ring miter-gear, e. Meshing with this is a small miter-gear, F, journaled in post D in a suitable bearing, and carrying at the outer end of its shaft a fast and loose pulley for the attachment of the engine-belt. A belt-shifter, f, projects from this to the platform, so that the work can be stopped at will. On the turning of gear F, gear e and sleeve E are rotated horizontally. A long sleeve, G, is let down into guiding-rings c, and rests in a recess in the top of sleeve E, having one or more notches, g, in its edge to engage with corresponding lugs h in sleeve E, or vice versa. The sleeve G has one or more splines, i, inside, fitting a correspondingly-grooved collar, H, which can slide up and down in the sleeve G. Collar H is provided with a female thread or other means of attachment to the joints of tubing to be used. By these connections the revolution of gear-wheel F revolves ring-gear e and sleeve E, which revolve sleeve G, and this, in turn, revolves collar H. If, now, we lower the drill-stock A into the hole and couple on sections of pipe A' as we go, when the drill rests on the bottom a rigid connection extends up from it into sleeve G. The upper end of such tubing is screwed into collar H, the engine-belt thrown onto the fast pulley, and thus the whole line of tubing and the drill are steadily rotated, the weight of the line serving to keep the drill to its work, collar H allowing its feed while rotating, and at the same time an open passage extends from the drill to the surface or to top of sleeve G.

Journaled at right angles to gear F in a suitable sheave is a small gear, I, meshing with gear e under the platform, and having a pulley, K, attached, as shown.

On one side of the frame-work is journaled a crank-shaft, J, having a pulley, k, on one end in line with pulley K. Beyond this is journaled a combined "bull-wheel" and sand-pump reel, the bull-wheel L having a loose pulley, l, on its shaft, and on same shaft the sand-pump reel M at its other end.

A belt, m, passes from pulley K to bull-wheel L and its loose pulley l, first passing under and bearing against the crank-shaft pulley k, to which it gives motion.

From an elbow-crank on shaft J a pitman-rod, n, rises to a walking-beam, N, on the gin-pole B, to whose other end is fitted a pump-rod, o, which operates a pump to supply feed-water to the boiler, and also to do the pumping when we have to test the well.

Belt m is shifted to either wheel L or l by a shifter, p, which extends to platform C.

From reel M, and winding thereon, rises a rope or chain, q, to a pulley or block, P, hung on the gin-pole, passing over which it carries the sand-pump Q, which is always kept ready for work. This sand-pump is of any of the usual patterns.

On the far end of reel M is a brake-wheel, W, having a strap, r, around it, one of whose ends is fixed to the timbers, and the other passes under a staple to a hinged lever, s, which extends up to platform C. This serves to check the descent of the sand-pump, tools, or tubing when lowering.

The whole apparatus is fixed on a frame-work of timbers, and is movable, for which purpose wheels may be attached underneath.

Operation: We insert the drill, (usually eight inches diameter,) and lower it into the hole by coupling on joints of pipe till it touches the rock with its lower end, the upper end of the pipes being fitted to collar H in sleeve G. We then start it rotating and keep it going continuously, the sand being removed from time to time by operating the reel and bucket up and down through the pipe until a new joint of pipe is necessary to proceed lower. Then sleeve G is lifted away, collar H uncoupled, and a new joint of pipe attached to what is already in the well. Collar H is now coupled on, and sleeve G lowered to position, and all started again. And so on, section after section is added, until the lowest fresh-water course is reached and passed. Then the tools must be withdrawn, and the usual casing inserted to shut off the water. After this a smaller (usually five-inch) drill is lowered, and sections of tubing coupled on till it reaches bottom, when the drilling is resumed and kept up till oil is struck without further removal of tools. When this happens it is at once necessary to find what the pumping yield is. Here, then, is one of our most valuable features, for we have but to lower the pumping apparatus, without taking out any of our tools, connect the pump-rod to the rod o, and start the engine. It is desirable to have disconnected the sleeve G to stop the drill. We are thus enabled to test a well immediately after striking oil, and without withdrawing the drill or tools; and this, with the ability to sand-pump in the act of drilling, or without taking out tools, and the practically uninterrupted drilling, enables us to reach oil and test the well in very much less time than drilling alone consumes by the old method. If the yield prove sufficient to go ahead, the tools are withdrawn, and the well tubed in the regular manner afterward.

From time to time, after getting the casing down and the water shut off, we pour in oil to keep the drill cool, to prevent the caking of sand on the drill and on the sides of the hole, to furnish a sand-pumping medium, and to accelerate the drilling. In some cases, however, this is unnecessary, as the drill may pass through a small pocket or vein of oil, and then the oil is naturally supplied to the tools. The contents of the sand-pump will show when pouring is necessary.

We prefer to make the cutting-edges of the drill a little longer than the diameter of stock, so as to clear the joints or couplings; also, the ends of the bar may have points.

We by no means limit ourselves to the precise arrangements shown for operating our drill and sand-pump, such as the described construction of derrick and machinery. These may all be modified without essentially departing from our invention.

What we claim, and desire to secure by Letters Patent, is as follows:

1. An open-bottom rotary tubular drill-stock having one or more cross-bars at its lower end, armed with diamond cutting-points, the plane of whose cutting-edges is at right angles to the drill's axis, said points being immovably fixed to the stock, substantially as described.

2. The combination, for deep-well boring, of a rotary tubular drill-stock and drill capable of cutting its full area with a rigid tubular drill-rod, consisting of one or more joints of metallic pipe coupled together and to the drill-stock, the same being of uniform bore, and open at the top for the unobstructed introductiion of a sand-pump or pump-piston at any time while the drill is operating, substantially as set forth.

3. The combination of a tubular drill-stock, tubular drill-rod, having the driving mechanism wholly exterior and the mouth open and unobstructed, and a sand-pump, operating or capable of operation inside the drill rod and stock while the latter are in motion, substantially as specified.

4. A drilling and test-pumping device for deep wells, consisting of successive sections of rigid pipe of uniform bore, and open at its upper end, attached to a tubular drill-stock, providing a continuous passage-way for and in combination with a pump piston and rod, arranged and operating substantially as described, whereby, when oil is struck, the well may be test-pumped without removing any parts.

5. In combination with the sand-pump Q and rope $q$, the reel M, and wheel L on the same shaft, constituting a combined sand-pump reel and bull-wheel, substantially as shown.

6. The combination of driving-pinion F, driven gear $e$, socketed and having lugs $h$, splined and slotted sleeve G, and grooved collar H, for attachment to the tubular drill-rod, said arrangement of gear $e$, sleeve G, and collar H forming the sole connection between the power and the drill, whereby the mere lifting of the sleeve G from its socket disconnects the power and stops the drill, as specified.

7. The combination of driven gear $e$, having socket and lugs $h$, with a removable splined sleeve, G, having slots to correspond with said lugs, said sleeve G being held to position solely by its own weight, substantially as shown, whereby said sleeve can be readily disconnected for the attachment of a new joint of tubing.

8. The combination of a rotary drill, a tubular connection from it to the surface, and open at its upper end, and of uniform bore throughout, a grooved collar, H, removably attached to the upper end of the tubular connection, and the driven sleeve G, splined to fit collar H, substantially as described, whereby the drill may gravitate to its work while being rotated, and, being of uniform bore throughout and open at top, affords room for the introduction and operation of other tools while so rotating.

In testimony that we claim the foregoing we have hereunto set our hands.

BENJAMIN F. ASPER.
ROBERT MAGILL.

Witnesses:
THOS. J. McTIGHE,
THOS. CONNOLLY.